United States Patent [19]
Goodman et al.

[11] 3,896,204
[45] July 22, 1975

[54] MELT-EXTRUSION OF ACRYLONITRILE POLYMERS INTO FILAMENTS

[75] Inventors: Albert Goodman, Martinsville; Mark A. Suwyn, Waynesboro, both of Va.

[73] Assignee: E. I. du Pont de Nemours and Company, Wilmington, Del.

[22] Filed: Oct. 2, 1972

[21] Appl. No.: 294,186

[52] U.S. Cl.. 264/206; 260/29.6 AN; 260/29.8 AQ; 264/182; 264/211; 264/210 F
[51] Int. Cl.² ............... D01F 7/00; D01D 5/04
[58] Field of Search...... 264/176, 182; 260/29.6 AN

[56] References Cited
UNITED STATES PATENTS

| | | |
|---|---|---|
| 2,684,348 | 7/1954 | Dietrich et al. .................... 264/206 |
| 3,560,425 | 2/1971 | Wolinski ..................... 260/29.6 AN |
| 3,634,575 | 1/1972 | Serad .................... 264/206 |
| 3,655,857 | 4/1972 | Bohrer et al. ............... 260/29.6 AQ |
| 3,669,919 | 6/1972 | Champ ...................... 260/29.6 AQ |
| 3,752,782 | 8/1973 | Thompson et al. ......... 260/29.6 AN |
| 3,755,230 | 8/1973 | Thompson ................. 260/29.6 AN |
| 3,770,663 | 11/1973 | Ueki et al. ........................ 260/37 N |
| 3,770,856 | 11/1973 | Ueki et al. ............................ 264/13 |
| 3,774,384 | 11/1973 | Woodell............................. 161/172 |

Primary Examiner—Jay H. Woo

[57] ABSTRACT

Compositions which are substantially single phase partial or complete hydrates of an acrylonitrile polymer can be extruded into filaments within a certain elevated temperature range. Extrusion is facilitated, and properties of the article extruded are enhanced, by the addition to the extrusion mixture of a small amount of a compatible solvent for the polymer.

10 Claims, 4 Drawing Figures

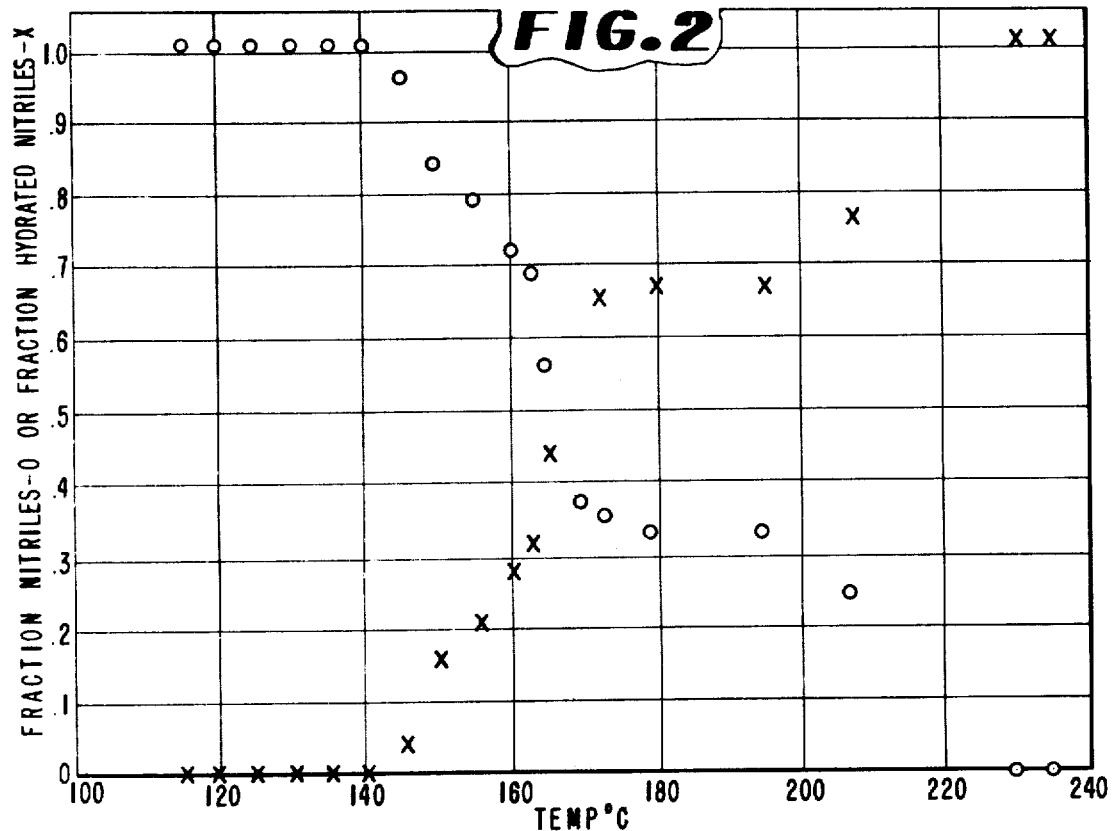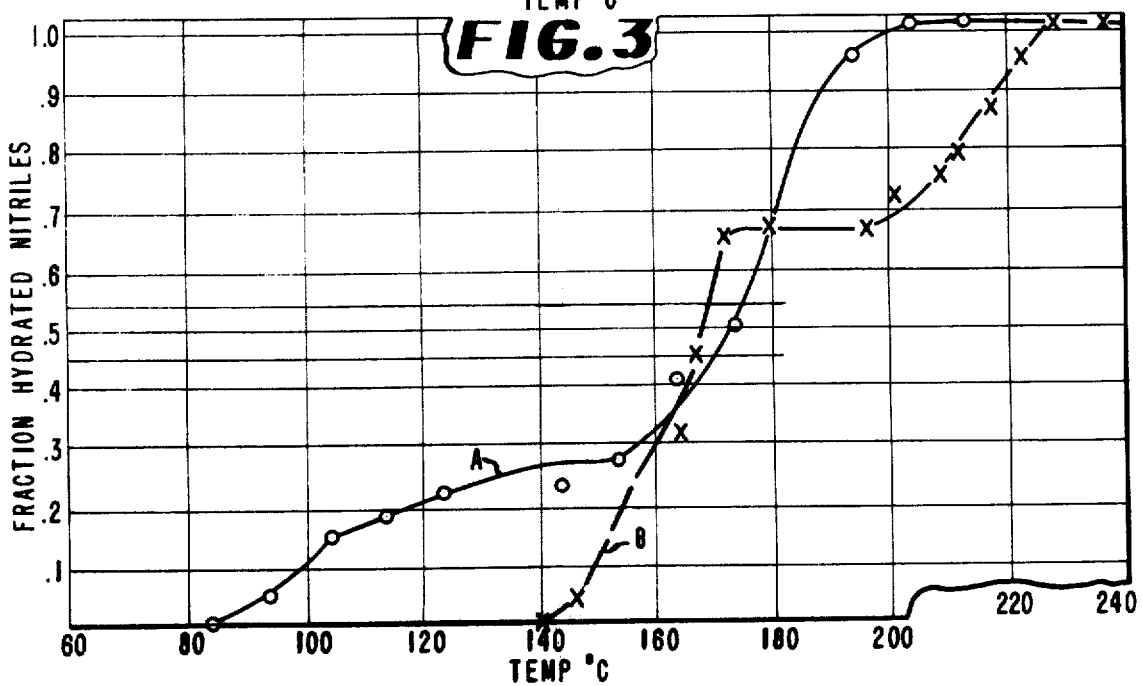

MELT-EXTRUSION OF ACRYLONITRILE POLYMERS INTO FILAMENTS

FIELD OF THE INVENTION

This invention relates to a process for shaping shapable compositions containing acrylonitrile polymers, and particularly to an improvement in the method for forming shaped articles therefrom by extrusion from a water/polymer mixture.

BACKGROUND OF THE INVENTION

Acrylic and modacrylic polymers are well known, and it is known that compositions containing them can be used to form shaped articles such as filaments. The process for forming such shaped articles typically involves dissolving the polymer in a solvent, extruding the "polymer solution" through a die or a multiplicity of dies and removing the solvent either in a wet bath (wet extrusion) or by flow of gas (dry extrusion), thus causing or assisting solidification of polymer into shaped structures. These types of extrusion require equipment for removing solvent and reconditioning it where applicable for future use. The expense of, and the necessity for, such removal and reconditioning, along with requirements for low solvent content in the final shaped article make it highly desirable to provide acrylonitrile polymer compositions suitable for shaping by means other than the wet or dry extrusion of solvent solutions described above. Some modacrylic compositions are theoretically "melt" extrudable into filaments; that is, under high pressures, low rates of extrusion are obtained. However, "melt extrusion" of modacrylics does not appear to have gained commercial acceptance probably due to the poor economics of the low extrusion rates. In addition, various proposals for melt-spinning acrylic polymers by plasticizing them with solvents for the polymer have been made, as for example in Rothrock U.S. Pat. No. 2,706,674, Hare U.S. Pat. No. 2,764,468, Farago U.S. Pat. No. 3,094,502 and Hare et al. U.S. Pat. No. 2,699,433. However, these proposals suffer from a substantial measure of the same deficiencies found in procedures for dry- and wet-spinning.

Some attempts have been made to spin acrylonitrile polymer filaments from mixtures of the acrylonitrile polymer and water. However, these attempts, such as Bynum U.S. Pat. No. 3,402,231 and Coxe U.S. Pat. No. 2,585,444, have resulted in fibrillar materials suitable for making paper, or in strands of fused and sintered or foamed particles. They have not resulted in filaments suitable for textile purposes in clothing and rugs and the like.

More recently, a composition comprising acrylonitrile polymer and small amounts of water has been found suitable for economically forming shaped structures, such as filaments, when the composition is extruded under carefully selected conditions. This procedure, more fully described in U.S. application Ser. No. 189,202, filed Oct. 14, 1971, involves the preparation of an extrudable substantially single-phase composition of a partial or complete hydrate of the polymer. In other words, the water is associated with, i.e., hydrates, the nitrile groups in the polymer and is present in an amount equivalent as a minimum to either 45 percent of that required to hydrate all the nitrile groups or 80 percent of that required to hydrate the coupled nitrile groups (on a 1/1 water molecule/nitrile group basis), whichever is larger, and as a maximum the amount combined as hydrate at the temperature employed plus 7 weight-percent water based on polymer, provided the total water does not exceed that required to hydrate all the nitrile groups. It was found that hydration occurs only within a certain elevated temperature range and under at least autogenous pressure, and that under these conditions the hydrate could be extruded to obtain a novel acrylonitrile filament characterized by a sheath-core arrangement in which the sheath has a positive density gradient, i.e., wherein the highest density is at or near the filament surface, and the drawn filament has a novel Luster Source Index. These filaments were found to have good straight tensile properties, but were deficient in loop tenacity.

It has now been discovered that if a minor proportion of a compatible organic solvent for the polymer is added to the extrudable single phase composition described in the preceding paragraph, the loop properties of the extruded filaments are improved without altering other desirable properties and characteristics to any substantial extent, and their dyeability is increased. This discovery forms the invention described hereinafter.

SUMMARY OF THE INVENTION

A process for preparing acrylonitrile polymer filaments having improved loop tenacity which comprises:
1. forming a substantially single phase composition of
   a. a polymeric component comprising one or more acrylonitrile polymers, each containing at least 40 weight percent units derived from acrylonitrile,
   b. water substantially associated with the nitrile groups of the polymeric component, said water being present in an amount equivalent as a minimum to either 45 percent of that required to hydrate all the nitrile groups or 80 percent of that required to hydrate the coupled nitrile groups (on a 1/1 water molecule/nitrile group basis), whichever is larger, and as a maximum the amount combined as hydrate at the temperature employed plus 7 weight-percent water based on polymer, the total water not to exceed that required to hydrate all nitrile groups, said amount of water optionally being reduced by a weight amount up to that of component (c) employed, and
   c. from about 0.5 percent to about 10 percent, preferably 3-7 percent, based on weight of polymeric component, of a compatible solvent for said polymeric component; and
2. extruding said substantially single phase composition at a temperature between about 25°C. below and about 10°C. above the temperature of hydrate formation of the polymeric component, and under at least autogenous pressure.

DESCRIPTION OF THE DRAWINGS

FIG. 2 is a plot derived from Laser Raman Spectroscopy data which indicates the degree of nitrile hydration of an acrylonitrile polymer as a function of temperature.

FIG. 3 is a plot derived from Laser Raman Spectroscopy data which indicates the degree of nitrile hydration of two acrylonitrile polymers as a function of temperature.

DESCRIPTION OF THE INVENTION

Figure 1:
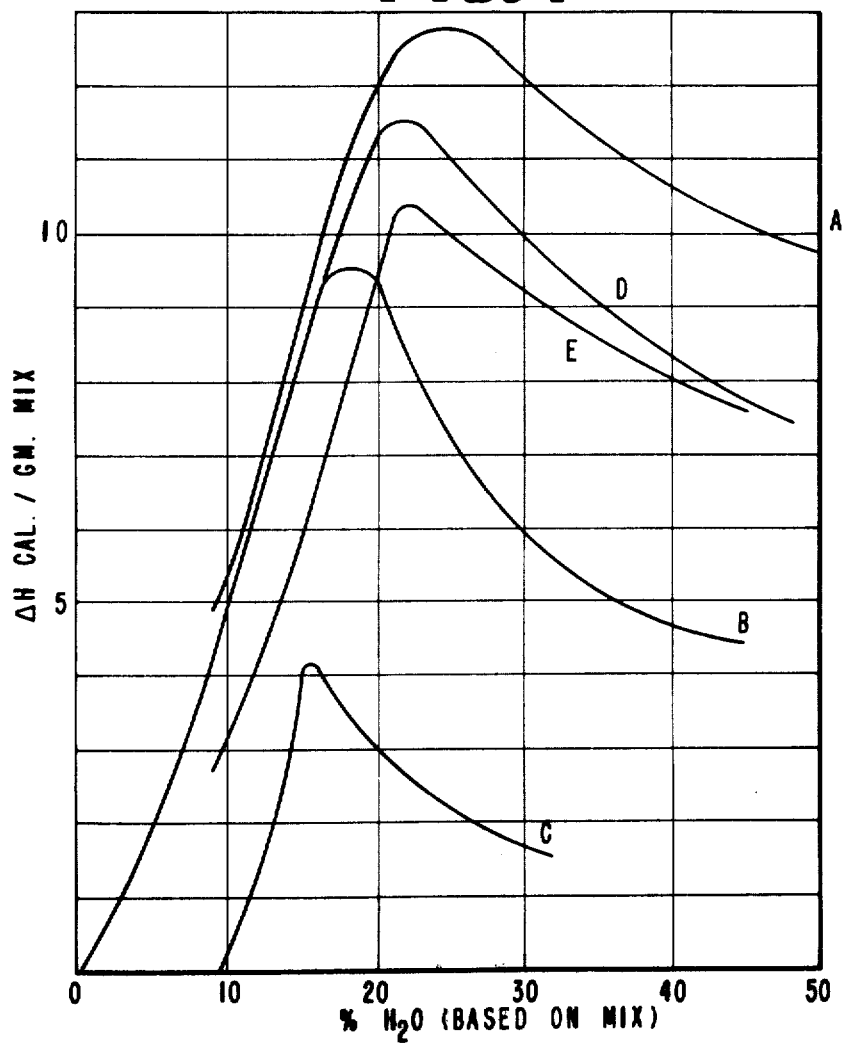
FIG. 1 is a graph which illustrates the use of differential thermal analysis to determine the heat needed to uncouple/hydrate coupled nitrile groups of acrylonitrile polymers.

The term "acrylonitrile polymers" as used herein is defined as those polymers which contain at least 40 weight percent acrylonitrile, i.e., units of acrylonitrile made up of at least 40 percent of the polymers by weight. Thus, the term includes acrylic polymers and modacrylic polymers. The terms "acrylic polymer" or "acrylic filament" as used herein is defined as meaning those polymers containing at least 85 percent by weight units derived from acrylonitrile and filaments derived therefrom. Such polymers include the homopolymer of acrylonitrile (i.e., polyacrylonitrile) and copolymers of acrylonitrile with one or more suitable monomers copolymerizable with acrylonitrile. Suitable comonomers for all the acrylonitrile polymers include addition polymerizable compounds containing an ethylenically unsaturated moiety such as methyl acrylate, methyl methacrylate, vinyl acetate, styrene, acrylamide, methacrylamide, methacrylonitrile, vinyl chloride, halogenated styrenes, methyl vinyl ketone, vinyl pyrrolidone, the vinyl pyridines such as 2-methyl-5-vinyl pyridine, ethylene, sulfonic acids such as styrenesulfonic acid, vinylsulfonic acid, allylsulfonic acid, methallylsulfonic acid, and the amine, alkali-metal or alkaline earth metal salts of such sulfonic acids. Preferred such copolymerizable monomers include methyl acrylate, vinyl acetate, styrene or a mixture of two or three of them, together with styrenesulfonic acid or its salts with alkali metals such as sodium. The preferred modification is dependent on properties desired in the shaped structure and characteristics, including molecular weight, of the comonomer selected.

Inherent viscosities of the acrylonitrile polymers usually range between 0.4 and 2.0 as measured at 30°C. in a solution of 0.5 gm polymer in 100 cc. of dimethylformamide. Preferably, the inherent viscosity will be in the range of 0.7 to 1.1.

Intrinsic viscosities are determined at 25°C. in a 0.2-molar solution of lithium bromide in DMF as solvent. Preferably, the intrinsic viscosity will be in the range of about 0.8 to 1.1.

The term "coupled nitrile groups" refers to those nitrile groups along the chains of acrylonitrile polymer molecules that are coupled by dipole-dipole interaction, i.e., where one nitrile is attracted to, and associates with, the closest nitrile or nitriles. At ordinary temperatures most acrylonitrile polymers exist in a molecular configuration wherein nitrile groups along one molecular chain are coupled with nitrile groups along one or more adjacent molecular chains. If the polymer is a homopolymer of acrylonitrile, substantially all the nitrile groups are coupled or are capable of coupling under conditions which provide adequate mobility to the molecular structure. If the polymer is a random copolymer containing up to about 15 weight percent comonomer units, the presence of the copolymerized units hinders the coupling ability of some of the nitrile groups of the acrylonitrile units and thus reduces the number of coupled nitriles. When the copolymer contains more than about 15 weight percent of the more commonly used modifiers such as methyl acrylate or vinyl acetate, substantially all nitrile couplings are hindered by the presence of the comonomer units.

A "compatible solvent for the polymer" is defined as a solvent, composed of one or more compounds, which meets the following criteria: (1) it must be capable of forming a diluable solution thereof containing about 10 percent, by weight, of polymer at some temperature below about 180°C.; (2) the resulting solution must have a homogeneous appearance to the unaided eye; and (3) no component of the solvent may undergo substantial chemical reaction with other components of the solvent, the polymer, the polymer hydrate or free water at a temperature of 180°C. for a period of at least 1, preferably 30, minutes. It is satisfactory for a solvent to meet these criteria only under conditions of augmented pressure. Surprisingly, the boiling point of the solvent is of little or no consequence; if a solvent meets the above criteria of solvent power and chemical stability in the hydrate system, even one which boils below 100°C. is satisfactory for use in the process of this invention.

"Compatible solvents for the polymer" include 2-pyrrolidone, ethylene carbonate, propylene carbonate, propiolactone, γ-butyrolactone, δ-valerolactone, γ-valerolactone, dimethylformamide, dimethylacetamide, N-acetyl morpholine, methyl ethyl sulfone, tetramethylene sulfone, tetramethylene sulfoxide, methyl ethyl sulfoxide, dimethyl sulfone, dimethyl sulfoxide, acetonitrile, sodium thiocyanate (in water) and generally any known solvent for acrylonitrile polymers which meets the abovedescribed criteria. Preferred solvents are 2-pyrrolidone ethylene carbonate, and tetramethylene sulfone based primarily on the important sub-criterion of low toxicity. A solvent which has a marginal instability is useful in the practice of this invention through the expedient of late-injection of the solvent into the preformed melt so that minimal exposure to the high temperature process is entailed. Those with superior stability are more versatile; 2-pyrrolidone, as an example, may be incorporated with the polymer feed, or with the water feed, or may be injected as a separate stream into the initial mixing step with no undesirable side effects. Under these conditions, ethylene carbonate undergoes slight hydrolysis in the process, and the by-product carbon dioxide leads to undersirable bubbles in the extruded structure. It is preferred, therefore, when using ethylene carbonate or a solvent of similar marginal stability to inject it at a late stage in the extrusion operation so as to minimize exposure to high temperature.

The amount of solvent within the prescribed range to be employed will be determined by several considerations including the molecular weight of the polymer employed (a larger amount of solvent is useful in reducing the high melt viscosity of compositions comprising high molecular weight polymer) and the process conditions to be employed. It is generally preferred to employ the minimum amount of solvent commensurate with development of the desired transverse properties in the filaments in the interest of process economy.

The extrudable single phase composition is formed only within a definite range of elevated temperatures. It had already been found that if fewer than 45 percent of all the nitrile groups of the polymer are hydrated, i.e., associated with water molecules, the composition does not have the fluidity or homogeneity required for acceptable extrusion and drawability of the spun product; and that when any coupled nitrile groups are present, the polymer composition is difficult to extrude if fewer than 80 percent of the coupled nitriles are hydrated. On the other hand, if water is present in a substantial excess over that capable of hydrating nitrile groups of the polymer at a particular temperature of the composition within the temperature range at which hydration occurs, then the excess water (i.e., water over and above that amount able to combine with the nitrile groups at the selected temperature) will tend to form a second phase. Minor amounts of such excess water (i.e., up to about 7 weight percent on polymer more than can combine as hydrate at the temperature employed) may be tolerated, the total water not to exceed that required to hydrate all the nitrile groups. A larger (9–10%) excess may be tolerated if the comonomer units are hydrophilic, but a gross excess of water is unacceptable because it interferes with extrusion and causes bubbles and shattering of the extrudate, as well as causing process discontinuities.

Figure 4:
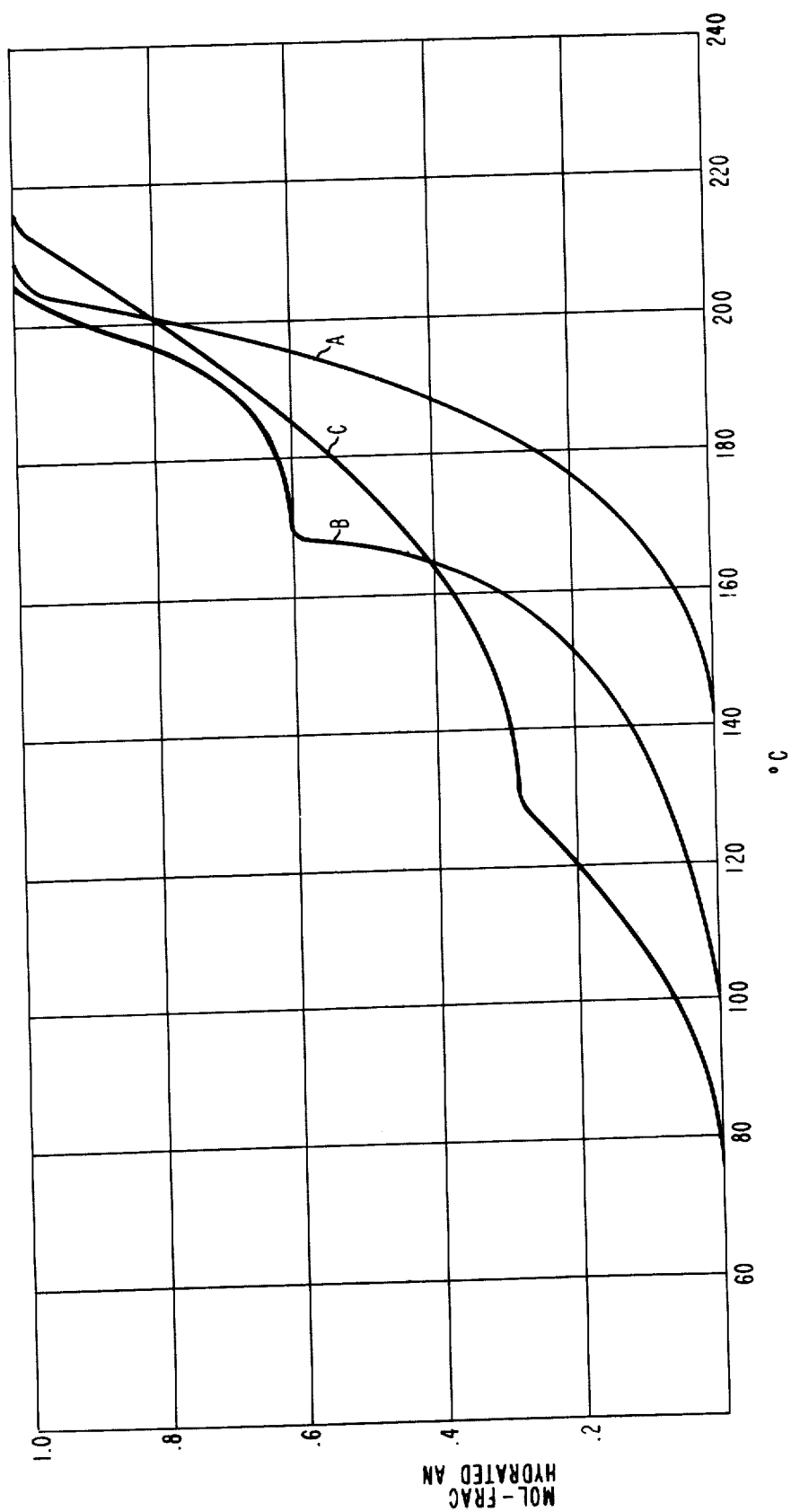
FIG. 4 is a plot derived from Laser Raman Spectroscopy data which illustrates the similarity between added solvent and presence in the polymer of a comonomeric modifier in their effect on the hydration of an acrylonitrile polymer.

The addition of the compatible solvent to such compositions makes the foregoing water amount requirements somewhat less rigid also; substantially single phase compositions result either when the water content is reduced (relative to the above-described requirements) by an amount up to about equal the weight of the compatible solvent added, or when the solvent is simply added without further change in the composition. The reason for this additional flexibility in solvent-containing compositions is not clearly defined. There are indications that the polymer associates with a true solvent in preference to water at temperatures up to about 180°C. Thus, in FIG. 4, curve A represents the hydration degree of polyacrylonitrile (no comonomeric modifier) as temperature is increased. Curve B represents the hydration of polyacrylonitrile in the presence of 3 percent ethylene carbonate, and Curve C represents hydration of polyacrylonitrile in the presence of 5 percent ethylene carbonate (both based on polymer). It will be noted that hydration in the presence of solvent occurs in stages, indicating the presence of a hindrance to coupling in those cases where a solvent is present. It is hypothesized that the polymer-solvent association is more stable than the polymer-water association and that the presence of solvent reduces the coupled nitrile groups available for lower-temperature association with water. This might explain the reduced water requirement (and availability of the option to reduce water by an amount equal to the added solvent). The tolerance for the excess of water, which ordinarily would tend to form a separate phase, is not understood. It is possible that the solvent-polymer association is reversible and that the portion of the solvent not associated at any time may act as a solubilizing agent for that portion of the water simultaneously unassociated.

Thus, to be practicably shapable into filaments, the extrudable compositions of an acrylonitrile polymer, water and compatible solvent that are useful in the process of this invention must contain as a minimum about 45 percent of the water required to hydrate all the nitrile groups or 80 percent of the water required to hydrate any coupled nitrile groups in the polymer, whichever is greater, or such amount less a weight amount up to that of the compatible solvent employed. It is important that the larger of the 45 percent and the 80 percent minima be met. In general, with polymers containing about 7.5 weight percent or less modification by one or more of the more commonly used copolymerizable monomers, the minimum amount of water needed, before optional reduction based on compatible solvent, for good shapability will be 80 percent of that required to hydrate the coupled nitrile groups. Polymers of higher (i.e., over 7.5 weight percent) modification with units of such monomers usually require as a minimum, before optional reduction based on solvent, that amount of water needed to hydrate 45 percent of the total nitrile groups.

The compositions to be shaped can readily be formed by adding the exact amount of water desired to hydrate between as a minimum 45 percent of all the nitrile groups or 80 percent of all the coupled nitrile groups, whichever is greater, and as a maximum the amount combined as hydrate at that temperature plus 7 weight percent on polymer, the total water not to exceed that required to hydrate all nitrile groups, (observing the same limitation on total and the optional reduction of up to the weight of the compatible solvent employed in either case), and from 0.5–10 percent of the compatible solvent for the polymer, and heating the mixture under autogenous or higher pressure to the temperature ($T_h$) needed to form a single phase (which is indicative of hydrate formation). Alternatively, an excess of water may be employed, the composition heated to the desired temperature under autogenous pressure and the excess water removed by either gravity separation (the molten hydrate is heavier than water) or evaporation. Practical considerations, such as stability of the solvent in the system, will dictate whether to add the solvent before or after the concentration step. After preparation, the composition will retain its single-phase character at somewhat higher and lower temperatures than that needed for preparation. Thus, the solvent-containing extrudable composition, once prepared, is shapable at temperatures of up to about 25°C. less to about 10°C. more than $T_h$ (the minimum temperature of preparation). Shaping of the composition at a lower temperature than that needed for preparation of the hydrate accelerates quenching and promotes formation of solid filaments.

a. Determining the Amount of Water Necessary for the Polymer/Water Composition

The first step in selecting a shapable, single phase composition of this invention is to determine the amount of water required to hydrate the polymer in the absence of the compatible organic solvent. Because of nitrile groups of the homopolymer of acrylonitrile are essentially 100 percent coupled, the minimum amount of water needed, in the absence of the solvent, to obtain shapable compositions will be that amount necessary to hydrate 80 percent of the nitrile groups in the homopolymer. Similarly, because coupling of the nitrile groups in copolymers of acrylonitrile in which the comonomer units comprise about 15 weight percent or more of the units of the copolymer is essentially completely hindered, the minimum amount of water needed to obtain shapable compositions of these copolymers will be that amount necessary to hydrate 45 percent of all the nitrile groups of the polymer. The maximum amount of water which can be accommodated by either the homopolymer or the more common copolymers is that amount combined as hydrate at the temperature employed plus 7 weight percent based on polymer, the total water not to exceed that required to hydrate all nitrile groups.

The determination of the minimum amount of water that can be used in the absence of the compatible organic solvent with a copolymer of acrylonitrile that contains up to about 15 weight percent comonomer units is not as simple as merely making the calculations of the foregoing paragraph, because these copolymers may contain both coupled and uncoupled nitrile groups. In other words, the amount of water which constitutes a minimum will depend on how many coupled nitrile groups are present in the polymer. To determine how many coupled nitriles are present, differential thermal analysis (DTA hereinafter) of copolymer-water mixtures is carried out. DTA is a means of measuring endothermic or exothermic events in a sample as the temperature of the sample is changed, and the data suggest that the uncoupling-hydration of coupled nitrile groups is an endothermic event. Thus, in a recording of the amount of heat absorbed as a sample of an acrylonitrile polymer and water is heated by the DTA procedure, the magnitude of any increase in the amount of heat absorbed over a certain temperature range is taken as a measure of how much uncoupling hydration of the coupled nitrile groups has occurred.

By carrying out a series of DTA determinations (the procedure for this is set forth further below) on a given acrylonitrile polymer/water mixture where the only variable throughout the series is the proportion of the polymer and water present, a graph can be constructed which plots $\Delta H$ (calories absorbed during the uncoupling-hydration of coupled nitrile groups) against the water content of the material. Such a plot is shown in FIG. 1, where curves A through E represent the plots for five different acrylic polymers. The curve marked A represents the data for polyacrylonitrile, wherein essentially all the nitrile groups are coupled. Thus, the $\Delta H$ maximum value for this curve is believed to represent the heat in calories involved in uncoupling hydration of every coupled nitrile in an essentially completely coupled polymer. If the polymer employed is a copolymer, there will be a lesser number of coupled nitriles present (as explained above, the presence of comonomer units hinders nitrile coupling), and the $\Delta H$ maximum for such copolymers will necessarily be less than the $\Delta H$ maximum for polyacrylonitrile. By taking the ratio of $\Delta H$ maximum for any copolymer to $\Delta H$ maximum for polyacrylonitrile, the weight fraction of the copolymer which is coupled acrylonitrile residues is obtained.

Table 1 lists the five acrylic polymers whose DTA curves are shown in FIG. 1, along with the calculated amount (weight percent on polymer) of water that is needed to completely hydrate all the nitrile groups in the polymer, and the $\Delta H$ maximum value for each polymer. From this $\Delta H$ data, the amount (weight percent on polymer) of water needed for hydration of all the coupled nitrile groups in the polymer is calculated.

The values plotted in FIG. 1 are chosen to make determination of maximum $\Delta H$ more precise; i.e., by expressing $\Delta H$ in terms of calories per gram of mix, $\Delta H$ decreases with additional water beyond that required to hydrate the coupled nitrile groups, clearly identifying the maximum $\Delta H$. Once the maximum value has been determined for a given polymer, it is more useful to express $\Delta H$ in terms of calories per gram of polymer; the most accurate determination of water requirement is derived from these values as follows (illustrated for polymer B):

$$\frac{11.7}{17.1} \times 34 = 23.3 \text{ parts water/100 parts polymer.}$$

TABLE 1

| FIG. 1 Curve | Polymer Composition (mol %)* | Calculated % Water Needed For Complete Hydration** | ΔH Maximum (cal./gm. of mix) | H Maximum (cal./gm. polymer) | DTA-Determined % H₂O For hydration Of Coupled Nitriles** |
|---|---|---|---|---|---|
| A | AN (100) | 34 | 12.8 | 17.1 | 33.3 |
| B | AN/MA/SSS (96.1/3.8/0.1) | 31.8 | 9.5 | 11.7 | 23.3 |
| C | AN/MA/SSS (92.1/7.8/0.1) | 29.7 | 4.2 | 5.0 | 9.9 |
| D | AN/SSS (99.5/0.5) | 33.3 | 11.5 | 14.7 | 29.2 |
| E | AN/SSS (98.9/1.1) | 32.6 | 10.4 | 13.5 | 26.8 |

*AN = acrylonitrile; MA = methylacrylate; SSS = sodium styrene-sulfonate
**parts water per 100 parts polymer As can be seen from FIG. 1, the empirical water needed for complete hydration of polyacrylonitrile (25 percent on mix; 33.3 percent on polymer) is in agreement with the calculated amount needed. It is also seen from the tabulated "DTA-Determined percent H₂O for Hydration of Coupled Nitriles" that the number of coupled nitriles in the copolymers B-E is less than the total number of nitrile groups present which illustrates the hindering effect on coupling caused by the presence of the comonomer units.

With data of the foregoing type in hand, one can calculate how much water is needed to hydrate 80 percent of the coupled nitrile groups and how much water is needed to hydrate 45 percent of all the nitrile groups. The minimum amount of water needed then in the absence of the compatible organic solvent, for this type of copolymer will be that amount which meets both criteria, in other words, the greater of the two amounts.

Illustration of this calculation for Polymer B is as follows:

80% of coupled: 0.8 × 23.3 = 18.64% water
45% of all nitriles: 0.45 × 31.8 = 14.31% water Thus it is seen that the minimum water content for Polymer B, in the absence of the solvent, should be chosen as 80 percent of that required to hydrate the coupled nitriles. For Polymer C, however, the "80% value" is 7.9 percent while the "45% value" is 11.4 percent, showing that for this polymer the minimum water, in the absence of the solvent, should be chosen as 45 percent of that required to hydrate all nitrile groups present.

The inclusion of up to 10 percent by weight (on polymer) of a compatible solvent in accordance with this invention does not in general require a departure from the polymer/water compositions determined by the foregoing procedure. It is evident, however, that use of the solvent makes the polymer/water ratio less critical. Not only is it possible to reduce the water content by an amount up to equal the weight of the solvent added, but a slight increase of water content over the maximum tolerable without solvent is sometimes feasible as a result of solvent use without incurring process difficulties.

b. Determination of the Hydration Temperatures

In this specification, the temperature of hydration, $T_h$, is the minimum temperature at which an operative polymeric component/water composition becomes a substantially single phase shapable melt, i.e. sufficient hydration to form a melt will occur. Water in excess of that which will combine at $T_h$ is tolerable within the limits outlined herein. If the hydrate melt obtained contains less combined water than that combined when all nitrile groups are associated in a 1/1 relationship with water molecules, then additional water can be combined, if present, by raising the temperature. Thus, for any polymeric component, an operative temperature may be selected over a range of operative temperatures.

If the composition has been raised to $T_h$, a moderate decrease in temperature up to about 25°C. can be tolerated without loss of shapability, due to hysteresis in the hydration/dehydration cycle. A moderate increase in temperature, up to about 10°C., can be tolerated also, but if excess water is present the formation of addition nitrile group/water associations may thereby result in an altered composition (depending on the relationship between hydration degree and temperature in that temperature range). In general, it has been found preferable to employ a temperature of shaping somewhat lower then $T_h$ and an excess of water within the operable range, as specified. This is detailed further below.

Determination of the hydration temperature of a particular polymer is also best accomplished in the absence of the compatible organic solvent. The single phase, solvent-free hydrated compositions discussed in the preceding section cannot be formed by simply adding an amount of water within the required range to the acrylonitrile polymer, because the hydrates are formed only at elevated temperatures. The required elevated temperatures can be determined for any acrylonitrile polymer composition either by visual means or, more accurately in many cases, by Laser Raman Spectroscopy.

The temperature can be approximated visually by adding the necessary amount of water to the polymer in a heavywalled glass tube, sealing the tube and heating the mixture. As the mixture is heated, the polymer appears to remain substantially in a dry powder form until hydration begins, whereupon the polymer becomes a somewhat turbid, visually uniform fluid. The turbidity diminishes upon heating to the still higher temperature required for completion of the hydration of all the nitrile groups, provided sufficient water has been added to allow complete hydration.

The more accurate means of determining the hydration temperature range involves the use of Laser Raman Spectroscopy (LRS hereinafter). LRS is a means of quantitatively determining certain types of bonds by analysis of the spectrum of scattered radiation resulting from exposure of a heated sample to a laser beam. By carrying out the LRS analysis (the procedure for which is set forth further below) on a sample of an acrylonitrile polymer in water, data is obtained from which a graph can be constructed which shows the amount of nitrile bonds present in the sample as a function of temperature. The graph can also be used to show the amount of hydrated nitrile groups present.

FIGS. 2 and 3 are plots of data obtained by LRS. FIG. 2 is a plot of LRS data obtained on a sample of copolymer B of Table 1. In FIG. 3, the curve marked "B" is a plot of the same LRS data, and the curve marked "A" is a plot of LRS data obtained on a copolymer of acrylonitrile/vinyl acetate/sodium styrenesulfonate in a weight ratio of 93.6/6/0.4.

As seen in FIG. 2, an LRS analysis of copolymer B of Table 1 reveals that as the temperature is raised the nitrile band (2234 $cm^{-1}$), which is denoted by the circles, begins to disappear to about 140°C., i.e., the nitrile concentration begins to decrease. The nitrile band reaches a plateau between about 170°C. and 190°C., then, as heating continues, finally disappears at about 225°C. Concurrently, a new band at 2050 $cm^{-1}$, which is denoted by the x's, appears at about 140°C., reaches a plateau between about 170° and 190°C. and rises to a maximum at about 225°C. It is seen that the plateau temperature of each is between about 170° and 190°C. and that the intensity of the nitrile band at this plateau is about one-third of its initial intensity, while the intensity level of the new band at the plateau is about two-thirds that of its maximum. Since the intensity of each band is expressed as a fraction of the maximum observed intensity of the band and since the height of the plateau in the hydrated curve (⅔ of maximum) approximates the value of the ratio of ΔH for said copolymer B to ΔH for polyacrylonitrile (11.7/17.1 = 0.68), these data may be interpreted as suggesting that the plateau defines a range of temperature to uncouple-hydrate the coupled nitriles of the polymer. The figure also suggests that as the hydrated nitrile curve continues to increase past the plateau and the nitrile curve continues to decrease, the uncoupled nitriles also become associated with water; this hydration is not monitored by the DTA analysis as described.

Not all acrylic copolymers exhibit a plateau suggestive of hydration of coupled nitriles. For example, copolymers of acrylonitrile and vinyl acetate or methyl vinyl pyridine appear to hydrate in the reverse sequence from that of the copolymer depicted in FIG. 2, i.e, they appear to hydrate by hydration of the uncoupled nitriles first, followed by hydration of the coupled nitriles. Vinyl acetate copolymers appear identical to their methyl acrylate counterparts in DTA analysis but appear very different in LRS analysis. This is illustrated by FIG. 3, which depicts a plot of LRS data from a terpolymer of acrylonitrile/vinyl acetate/sodium styrenesulfonate in a molar ratio of 93.6/6/0.4 as Curve A. Curve B is a plot of the LRS data obtained for the copolymer used to obtain the plot of FIG. 2, and has been inserted into FIG. 3 to aid in the discussion of Curve A.

To determine the lowest operable temperature at which a single phase solvent-free hydrate can be formed for any given acrylonitrile polymer ($T_h$), a horizontal line is drawn on the LRS graph at the 0.45 value for Fraction Hydrated Nitriles and another horizontal line is drawn at the Fraction Hydrated Nitriles value which corresponds to 0.8 times the fraction of coupled nitriles present (as calculated from the DTA ratios). Each horizontal line is drawn to intersect the Laser Raman data curve representing that polymer. The higher of the two temperatures values for these intersections has been found empirically to be about the minimum temperature at which a spinnable composition can be formed in the absence of a solvent. By taking the larger temperature value ($T_A$) and the correspondingly higher minimum water, one will ensure that both the limitations to hydrate at least 45 percent of all the nitriles and at least 80 percent of the coupled nitriles will be met.

The maximum temperature required to form the singlephase hydrates will be that temperature where all the nitriles are hydrated. Thus, by reading from the LRS graph the temperature at which all the nitrile groups are hydrated (where the fraction of nitriles hydrated equals 1), the temperature required for a fully hydrated composition is found.

Inclusion of the compatible organic solvent does not require a departure from the operable temperatures as determined by the above procedure. It has been found, however, that solvent addition reduces hydrate viscosity at a given temperature and permits extrusion at a somewhat lower minimum temperature. Reduction in water content by an amount up to the weight of the solvent employed tends to restore normal melt viscosity, as would be expected.

As stated earlier, it has been found that the shaping or extrusion temperature of a compatible solvent-containing hydrate may vary from the determined temperature of hydrate formation by about 25°C. below to about 10°C. above such temperature. Too low a shaping temperature will cause discontinuities during extrusion or result in a shaped article of poor quality, e.g., one containing frequent bubbles, because a part of the water will be in excess of that combined at that temperaturue (as is apparent from the LRS plot). If a lower than preferred temperature is used for shaping of a composition having a degree of hydration of the polymer near the minimum required, then it is preferable to use a polymer of lower inherent viscosity than would be used at higher shaping temperatures for compositions in which the amount of water present is near the maximum permissible.

On extrusion, there may be some tendency for bubbles to appear in the extruded structure. The formation of such bubbles can be suppressed by forced cooling of the emerging shaped structure or by use of pressure around the extrudate for a short time after extrusion. Deaerating the composition prior to extrusion is also useful. The deaeration can be carried out either by freezing the composition and evacuating the container, then reheating, or by processing the composition in a suitable screw-type extruder.

The single phase hydrate compositions useful herein have a practical degree of stability under autogenous or higher pressures and at temperatures in the range discussed above. They can be used to produce filaments which after drawing and boiling off have improved loop properties over filaments prepared without the presence of the compatible solvent when measured after boil-off for 30 minutes.

The extrusion itself can be carried out on conventional filament extruders, as for example a twin-screw or melt extruder.

c. Test Procedures

DTA Analysis Procedure

1. A polymer/water mixture (5–10 mg.) of known composition is rapidly transferred to a small aluminum cup and sealed hermetically. The cup is capable of withstanding a bursting pressure of 45 psig. (3.15 kg./cm.$^2$).

2. The sample cup is placed on one loop of the differential thermocouple in a "Stone" DTA Cell [Tracor Model SH-15BR2-Ni, which has a capability of 3,000 psig. (210 kg./cm.$^2$) internal pressure at 500°C.]. An empty sealed cup of the same type is placed on the other loop in the cell to serve as the reference side of the system.

3.. The cell is assembled, pressurized to 500 psig. (35 kg./cm.$^2$) with nitrogen, to minimize the chance of water loss from the sample cell ass a result of any small leak, and preheated at maximum furnace power for 2 minutes. The furnace is a Tracor (Stone) Model HP-202.

4. The temperature program is initiated (nominally 22.5°C. temperature rise per minute).

5. The cell is allowed to traverse the temperature range of interest while thermally induced events are recorded simultaneously on a strip chart recorder and on an X-Y plotter.

6. The peak area on the strip chart record is determined by use of a polar planimeter, and the corresponding heat of reaction is calculated by comparing this area with that generated by analysis of a reproducible standard (e.g., indium metal, which melts at 157°C.; $\Delta H = 6.79$ cal/gm.). The $\Delta T$/time curve is integrated from the first detectable deviation of the baseline from steady state to the point where the curve appears to have reestablished steady state after completion of the reaction, the baseline being linearly interpolated during the transition interval itself. The complete expression for heat of reaction (cal/gm. of polymer) is given by:

$$\Delta H \text{ (cal./gm. of mix) sample} = \frac{(\text{area})\text{sple.}}{(\text{area})\text{std.}} \times \frac{(\text{wt.})\text{std.}}{(\text{wt.})\text{sple.}} \times$$

$$\frac{(\Delta T \text{ sensitivity})\text{sple.}}{(\Delta T \text{ sensitivity})\text{std.}} \times \frac{(\text{chart speed})\text{std.}}{(\text{chart speed})\text{sple.}}$$

$$\Delta H \text{ (cal./gm. polymer)} = \frac{\Delta H \text{ sample (cal./gm. mix)}}{\text{wt. \% copolymer in sple.}} \times 100$$

std. = standard; sple. = sample

Reaction temperatures may be read directly from the temperature axis of the X-Y plotter, which records output of a thermocouple located in the sample chamber.

Pertinent transition temperatures may be read from the extrapolated intersection of the steady state baseline before initiation of the transition with the low-temperature edge of the endothermic peak.

EMF values are converted to temperatures utilizing published data for "Platinel" II (references to 0°C.) according to Olsen & Freeze, J. Nat. Bur. Stds. 68c 272 (1964).

The polymer/water ratio in the analyzed sample is determined thermogravimetrically by heating a separate sample to dryness in a stream of nitrogen.

LRS Analysis Procedure

The LRS procedure is as follows: a sample of the particular acrylonitrile polymer one desires to use combined with about 50 percent of its weight of water (excess water is without significant effect in this analysis) is sealed in a quartz tube after freezing and evacuating to the pressure corresponding to the vapor pressure of water at that temperature. The tube is mounted in a furnace in contact with a calibrated iron constantan thermocouple and heated through the temperature range of interest by means which permit gradual adjustment of temperature and holding at a given temperature for the time required to scan the spectrum of scattered radiation.

The sample is excited by an Argon Ion Laser ($\lambda$ = 4880A) operating at 200 milliwatts or less. The spectrum of scattered radiation is scanned at each temperature of interest using a "Spex" Model 1400 double monochromator. Scattered radiation at the selected wave length is allowed to fall on an "E.M.I."-9558QM photomultiplier tube, the output of which is measured by a photocounter (Solid State Radiation Company Model 1120) and recorded on a strip-chart recorder.

d. The Examples

In the Examples which follow, all parts are by weight and physical properties are measured on single filaments after boil off of 30 minutes or more in water unless otherwise indicated; "$l \times d$" represents length × diameter.

EXAMPLE 1

In this example ethylene carbonate is employed as the compatible solvent.

A copolymer of acrylonitrile/methylacrylate/sodium styrenesulfonate (93.63/6/0.37 weight) having an inherent viscosity of 0.9 is finely ground. Onto 100 parts of the polymer is sprayed a solution of 2.9 parts ethylene carbonate dissolved in 13.3 parts water. The mixture is placed in a jar, sealed, and rolled for 12 hours. The apparently dry powder is transferred to a cylinder equipped with one 50-mesh (~20 wires/cm.) and two 200-mesh (~79 wires/cm.) screens and a spinneret with a single hole 0.01 inch in both length and diameter (0.25 × 0.25 mm.). A tightly fitting, Teflon-gasketed free piston is inserted. The spinneret is closed by pressing a Teflon pad against its outer face. The cylinder is cooled to $-10°C$. and evacuated via a side-port between the piston and the spinneret until the watervapor pressure at that temperature is reached. The side-port is closed, the cylinder is heated to 180°C., and the spinneret is heated to 155°–175°C. for about 5 minutes. A pressure of 700°–1000 psig. (49–70 kg./cm.$^2$) of nitrogen is applied to the piston; the pad is removed from the spinneret; and a continuous filament is wound up at 75 ypm. (68 m./min.).

EXAMPLE 2

This example illustrates the use of varying amounts of the compatible solvent.

Five spins are made in which ethylene carbonate (EC) content is varied from zero to 13.3 percent (on polymer). In these preparations the indicated compositions based on the polymer of Example 3 are metered to a twin-screw extruder comprising, in sequence, feed, melting, mixing and metering zones, the highest temperature therein being as given in Table 2. The resulting melt is metered at the indicated pressure to a spinneret having 38 or 39 holes 0.010 inch × 0.007 inch in length × diameter (0.25 × 0.18 mm.) which is maintained at the indicated temperature. (Example 2F employs a spinneret with 12 holes of the same dimension.) The filaments are spun directly into a conditioning chamber which has the dimensions and conditions given and is pressurized with air at room temperature. All yarns are drawn to 800 percent of their as-spun length (8X) in saturated steam at the pressures indicated and boiled off. Tensile properties are as listed in the last column of Table 2.

TABLE 2

| Example | % H$_2$O/% EC (on polymer) | Temp. °C. Melt/ Spinneret | Pressure on Melt (kg./cm.$^2$) | Conditioning Chamber (length-cm./ Temp. °C.*/ Pressure-kg./cm.$^2$) | Windup (m./ min.) | Drawn Den./ Filament | Draw Pressure (kg./cm.$^2$) | Tensile Properties Straight T/E(gpd/%) | LoopT/P (gpd/%) |
|---|---|---|---|---|---|---|---|---|---|
| 2A | 26.5/0 | 175/172 | 42 | 20/140–145/atm. | 68 | 11.9 | 2.5 | 4.6/22.8 | 0.83/2.1 |
| 2B | 25.8/3.23 | 172/175 | 42 | 15/140/1.4 | 96 | 7.6 | 1.4 | 4.3/24.1 | 1.5/9.0 |
| 2C | 25/6.6 | 177/173 | 56 | 30/128/1.4 | 109 | 7.8 | 1.5 | 5.3/27.7 | 1.7/6.7 |
| 2D | 24/9.3 | 177/175 | 56 | 30/128/1.4 | 109 | 10.5 | 1.5 | 3.9/31.2 | 1.9/13.8 |
| 2E | 20/13.3 | 177/175 | 60 | 30/129/1.4 | 109 | 10.3 | 1.5 | 3.2/33.6 | 1.6/12.6 |
| 2F | 27.5/— | 170/169 | 63 | — | — | — | — | — | — |

EC = ethylene carbonate
T/E = Tenacity/elongation
*of air fed to chamber

The 2F preparation is unsuccessful. The spun filaments are foamy. Although this problem might be resolved with use of a conditioning chamber, there are wide fluctuations in spinning pressure, apparently due to flashing of a free-phase of water in the molten spin mix, which discourages further attempts to make a suitable product from this spin. Comparison with successful Example 2B illustrates clearly the lesser criticality of diluent concentration with use of a minor proportion of polymer solvent in the diluent.

It is also seen from a comparison of Examples 2D and 2E that no advantage is obtained with use of more than about 10% of the solvent (based on polymer).

EXAMPLE 3

This example illustrates the use of propylene carbonate (PC), $\gamma$-butyrolactone (BL), and tetramethylene sulfone (TMS) as the compatible solvent. Each is employed in a composition comprising 100 part of a polymer such as used in Example 1 having an intrinsic viscosity of 1.0, 25 parts water and 6.6 parts of the solvent, and the following conditions were used: temp. of melt/spinneret: 178/177°C.; pressure on the melt: 63 for PC, 56 for BL and TMS (kg./cm.$^2$); 39-hole spinneret, each hole 0.36 mm. long and 0.18 in diameter; conditioning chamber 30 cm. long operating at 132°C. with air and steam at 1.3 kg./cm.$^2$; a yarn windup speed of 109 m./min.; and a spun denier of 70. Single filament tensile properties of the yarn after drawing 8X in 1.4 kg./cm.$^2$ steam and boiling off are given in Table 3.

TABLE 3

| Solvent | Straight T/E gpd/% | Loop T/E gpd/% | Denier/Filament |
|---|---|---|---|
| PC | 4.2/29.4 | 2.0/15.2 | 9.5 |
| BL | 4.0/29.8 | 1.8/11.8 | 10.8 |
| TMS | 4.2/28.9 | 1.9/13.1 | 9.9 |

EXAMPLE 4

The apparatus of Example 2 is used in a somewhat modified procedure to shape compositions comprising several concentrations of 2-pyrrolidone (γ-butyrolactam). In these preparations, dry polymer as employed in Example 3 is formed into small briquettes which are metered continuously to the extruder in lieu of the polymer/water/solvent mixture; the water and the compatible solvent (2-pyrrolidone) are metered separately. The polymer employed is that of Example 2. The spinneret has 45 holes 0.125 × .1 mm. in $l × d$. The filaments are wound up in spinning at 122 m./min. (A) and 132 m./min. (B., C.) to yield a spun denier per filament of 20.2 in each case. A solution of 2-pyrrolidone in water is injected continuously into the mixing zone of the extruder to attain the compositions specified in Table 4, which also summarizes the other process data and the single filament tensile properties of the yarns produced after 8X drawing in steam at 1.3 kg./cm.$^2$ pressure and boiling off.

| Example | % H$_2$O/% 2P* (on polymer) | Temp. °C. Melt/Spinneret | Pressure on Melt (kg./cm.$^2$) | Conditioning Chamber (length-cm./Temp.°C.**/Pressure-Kg./cm.$^2$) | Drawn Den./Filament | Tensile Properties Straight T/E (gpd %) | Loop T/E (gpd/%) |
|---|---|---|---|---|---|---|---|
| 4A | 24.4/3.8 | 180/180 | 70 | 20/93/2.2 | 2.9 | 5.5/34.4 | 1.8/13.7 |
| 4B | 25/6.6 | 178/178 | 52.5 | 20/95/2.4 | 2.9 | 5.3/33.2 | 2.4/17.2 |
| 4C | 25.7/9.5 | 178/177 | 52.5 | 20/96/2.2 | 3.3 | 4.3/32.6 | 1.8/13.6 |

*2P = 2-pyrrolidone
**of air fed to chamber

EXAMPLE 5

This example illustrates the use of dimethyl formamide as the compatible solvent.

a. A copolymer such as employed in Example 3, water and dimethyl formamide in the weight ratio 100/24.3/10.8 are fed to a twin-screw extruder as in Example 4 and processed at a maximum temperature of 174°C. The melt which results is fed at 1080 psig. (76 kg./cm.$^2$) to a 39-hole spinneret (hole dimensions 0.014 inch × 0.007 inch — 0.36 × 0.18 mm. — in $l × d$) maintained at 176°C. Upon emerging from the spinneret, the filaments enter an 18-inch (45 cm.) long chamber in which by adding room temperature air the pressure is kept at 22 psig. (1.5 kg./cm.$^2$) and the temperature is 85°C. The filaments are withdrawn from the chamber at 196 ypm. (179 m./min.) to yield a spun yarn of 85 dpf.

The yarn is drawn 8X in 18 psig. (1.3 kg./cm.$^2$) steam to yield a 12 dpf yarn having single filament T/E/Mi of 3.7/27/67 and loop T/E/Mi of 1.7/11/54.

b. The preparation of part (a) is repeated except that the pressure is 1020 psig. (71 kg./cm.$^2$) and the filaments are spun into a chamber maintained as above at 12 psig. (0.84 kg./cm.$^2$) and at a temperature of 82°C. by introduction of air and withdrawn from the chamber at 390 ypm. (356 m./min.) to yield a yarn comprising 42-denier filaments.

On drawing 8X in 11 psig. (0.77 kg./cm.$^2$) steam and boil off this preparation yields a 7 dpf. yarn exhibiting single filament T/E/Mi of 3.4/28/61 and loop T/E/Mi of 1.9/13/56.

EXAMPLE 6

This example illustrates the use of a solvent boiling below 100°C. as the copatible solvent.

A polymer such as employed in Example 3, water and acetonitrile in the weight ratio 100/23.5/2.5 are blended and processed in a twin-screw extruder at a maximum temperature of 175°C. The resulting melt is delivered at 900 psig. (63 kg./cm.$^2$) to a spinneret such as employed in Example 5 maintained at 169°C. On emerging from the spinneret, the filaments enter a chamber 18 inches (45 cm.) long in which a pressure of 30 psig. (2.1 kg./cm.$^2$) and a temperature of 68°C. are maintained by introduction of air. The yarn is withdrawn at 95 ypm. (87 m./min.) and wound up. The yarn has a denier-per-filament of 85.

The yarn is drawn 8.5X in 16 psig. (1.1 kg./cm.$^2$) steam and boiled off to yield a 14 dpf. yarn having single filament T/E/Mi of 4.2/26/61 and loop T/E/Mi of 1.6/9/53.

EXAMPLE 7

This example illustrates the use of a compatible solvent in an extrudable, substantially single phase composition containing a hydrophilic polymer.

A copolymer of 96/4 weight ratio acrylonitrile/sodium styrenesulfonate having an intrinsic viscosity of 1.1, water and ethylene carbonate are blended in a weight ratio of 100/34/7 and processed in a twin-screw extruder in which the maximum temperature is 182°C. The melt is delivered from the extruder at 900 psig. (63 kg./cm.$^2$) to a 39-hole spinneret (holes dimensions: 0.014 inch × 0.007 inch — 0.36 × 0.18 mm. — in $l × d$) maintained also at 182°C. Upon emerging from the spinneret, the filaments enter a chamber 12 inches (30 cm.) long in which the temperature is maintained at 127°C. by introduction of air at atmospheric pressure. The filaments are withdrawn from the chamber and wound up at 125 ypm. (114 m./min.). The spun yarn has a denier-per-filament of 70.

The yarn is drawn 6X in atmospheric pressure steam and found to have a denier-per-filament of 13 and single filament T/E/Mi of 3.23/28.1/61 and loop T/E/Mi of 1.01/4.5/51.

In a companion experiment duplicating the above preparation except that no solvent is employed in the shaping composition, the spun filaments are of poor quality and cannot be drawn.

EXAMPLE 8

The apparatus of Example 1 is employed to make a filament from a spinnable mixture comprising 100 parts of a copolymer of 96 percent acrylonitrile and 4 percent sodium styrenesulfonate, having an inherent viscosity of 1.25, 1.6 parts sodium thiocyanate and 29.6 parts water. A temperature of 173°C. in both cylinder and spinneret is found too high and reduced to 170°C. in the cylinder and 160°C. in the spinneret. A continuous filament of good whiteness and few bubbles is wound up at 7 ypm. (6.4 m./min.) with a pressure of 800 to 1000 psig. (56–70 kg./cm.$^2$) on the cylinder. The filament is found to consist of 15 percent sheath (measured as percent of the radius) and 85 percent microvoided core (filament is 209$\mu$ in diameter; sheath is 16$\mu$).

The viscosity of a melt having the composition described above is measured at several shear rates on an Instron Rheometer by procedures known to the art in comparison with a composition comprising 100 parts of the same polymer and 29.9 parts water, both maintained at 180°C. The results tabulated below, each an average of three determinations, clearly illustrate a large reduction of melt viscosity as a result of incorporating only 1.6 percent sodium thiocyanate (on polymer) in the spin mix:

| Composition | Viscosity (poises) ×10$^{-3}$ | | | | |
|---|---|---|---|---|---|
| | at 46.9 | 117 | 234 | 469 | 1170 sec$^{-1}$ |
| 100/29.7/1.6 (Poly/H$_2$O/-NaSCN) | 2.52 | 1.24 | .75 | .43 | .29 |
| 100/29.0 (poly/H$_2$O) | 3.50 | 1.70 | 1.24 | 1.01 | .72 |

Compositions of acrylonitrile polymer, water and NaSCN are found by Laser Raman Spectroscopy to hydrate completely at 160°–180°C., whereas without the salt complete hydration occurs in the range of 200°–250°C. As little as 0.5–1 percent of the salt is effectual in altering the hdyration temperature. As much as 5 percent can be used without adverse effects on the process of shaping.

e. The Products of the Process

Filaments can be shaped from the substantially single phase polymer/water/solvent compositions. In those instances where the polymer used is one containing at least about 80 percent by weight units derived from acrylonitrile, the filaments are characterized by a sheath having a gradation in density with the highest density at or near the surface of the shaped article, and having substantially no voids in it whose diameter is over about 0.05 microns; i.e., can't be seen by usual scanning electron micrographs. The core of the filaments contains a plurality of voids, which appear to be closed-cell, as observed under microscopic examination. The void concentration is between about 10$^5$ to 10$^7$/mm.$^2$ of core cross-section and the voids range in diameter from those barely resolved (measuring about 0.05 micron) in a scanning-electron micrograph to a maximum of about 1 micron. When the as-spun filaments are drawn to about at least 200 percent, the skin of the filament develops multiple striations along the longitudinal axis of the filament, which are believed to contribute to the excellent dyeability of the filaments and to the ability of aggregates of these drawn filaments to transport, i.e., absorb, water at a rate several times that of filaments of the same acrylonitrile polymer that have been wet or dry spun by previously known procedures. The drawn filaments also have a diffuse, visible light reflectivity, or luster.

As stated earlier, the acrylonitrile-polymer filaments prepared by the process of this invention exhibit higher loop tenacities than filaments of the same overall draw ratio which were shaped from hydrate compositions which included no compatible solvent. In many instances the shaped product may contain the compatible solvent or a portion of it. In other instances, notably with 2-pyrrolidone, the solvent may be completely lost by boil off.

Additives recognized in the art may be used to modify the filaments of this invention provided they do not alter the novel structural features of the filaments. For delustering, the most generally used additive, titania, is of particular value. Additives known in the art for development of flame retardancy, antistatic properties, and those having utility as soil-release agents, colorants such as pigments and dyes, etc., are compatible and effectual with the compositions of this invention if stable to hydrolysis and thermal decomposition under the conditions specified.

The foregoing detailed description has been given for clearness of understanding only and no unnecessary limitations are to be understood therefrom. The invention is not limited to the exact details shown and described for obvious modifications will occur to those skilled in the art.

The embodiments of the invention in which an exclusive property or privilege is claimed are defined as follows:

1. In the process for preparing acrylonitrile polymer filaments, the improvement for providing better loop tenacities which comprises mixing and heating to form a substantially single phase composition of (a) one or more acrylonitrile polymers which contain at least 40 weight percent acrylonitrile units, (b) about 0.5 to about 10 parts by weight of a compatible solvent per 100 parts by weight of polymer, and (c) an amount of water which is between 45 and 100 percent by weight of the minimum amount required to hydrate all of the nitrile groups present in the polymer, with the proviso that there is sufficient water to hydrate at least 80 percent of any coupled nitrile groups present; extruding the substantially single phase composition under at least autogenous pressure to form filaments at a temperature between about 25°C. below and about 10°C. above the temperature of hydrate formation of the polymer; and then processing the filaments in conventional manner.

2. The process of claim 1 wherein said component (a) of the composition contains at least 80 weight percent acrylonitrile units.

3. The process of claim 2 wherein said component (b) of the composition is between about 3 and 7 parts by weight of a compatible solvent per 100 parts by weight of polymer.

4. The process of claim 3 wherein said compatible solvent is ethylene carbonate.

5. The process of claim 3 wherein said compatible solvent is 2-pyrrolidone.

6. The process of claim 3 wherein said compatible solvent is tetramethylene sulfone.

7. The process of claim 3 wherein said compatible solvent is acetonitrile.

8. The process of claim 3 wherein the acrylonitrile polymer is an acrylic polymer which contains methyl acrylate polymer units.

9. The process of claim 3 wherein the acrylonitrile polymer is a homopolymer of acrylonitrile, or a copolymer of acrylonitrile, sodium styrenesulfonate and either methyl methacrylate, vinyl acetate, styrene, or a mixture of two or three of them.

10. The process of claim 1 wherein the acrylonitrile polymer is an acrylic polymer.

* * * * *

UNITED STATES PATENT OFFICE
CERTIFICATE OF CORRECTION

PATENT NO. : 3,896,204
DATED : July 22, 1975
INVENTOR(S) : Albert Goodman and Mark A. Suwyn It is certified that error appears in the above-identified patent and that said Letters Patent are hereby corrected as shown below:

Col. 18, line 45, after "composition" insert --consisting essentially--.

Col. 18, line 48, after "compatible" insert --organic--.

Col. 18, line 56, after "form" insert --continuous--.

Col. 18, line 59, delete "processing" and insert --drawing--.

Col. 18, lines 59 and 60, delete "in conventional manner" and insert --at least 200%--.

Signed and Sealed this twenty-fifth Day of November 1975

[SEAL]

Attest:

RUTH C. MASON
Attesting Officer

C. MARSHALL DANN
Commissioner of Patents and Trademarks